United States Patent [19]

Yamada

[11] Patent Number: 5,357,652
[45] Date of Patent: Oct. 25, 1994

[54] LID OPENING/CLOSING APPARATUS

[75] Inventor: Satoshi Yamada, Kanagawa, Japan

[73] Assignee: Kato Hatsujo Kaisha, Ltd., Kanagawaken, Japan

[21] Appl. No.: 16,316

[22] Filed: Feb. 11, 1993

[30] Foreign Application Priority Data

Mar. 25, 1992 [JP] Japan .................................. 4-067041
Aug. 11, 1992 [JP] Japan .................................. 4-214122

[51] Int. Cl.⁵ .............................................. E05D 15/50
[52] U.S. Cl. ......................................... 16/232; 49/193; 220/333
[58] Field of Search ................................ 16/230–232, 16/DIG. 23; 49/382, 193; 312/100; 220/233

[56] References Cited

U.S. PATENT DOCUMENTS

| | | | |
|---|---|---|---|
| 164,534 | 6/1875 | DuFour | 16/232 |
| 280,785 | 7/1883 | Benson et al. | 16/230 |
| 1,187,088 | 6/1916 | Pfenninger | 16/230 |
| 2,648,092 | 8/1953 | Esslinger | 16/230 |
| 4,466,676 | 8/1984 | Nilsson | 16/DIG. 23 |

FOREIGN PATENT DOCUMENTS

| | | | |
|---|---|---|---|
| 54-44335 | 4/1979 | Japan | 49/193 |
| 54-155638 | 12/1979 | Japan | 49/193 |
| 2-101276 | 4/1990 | Japan | 16/232 |
| 3-189249 | 8/1991 | Japan | 16/232 |
| 3-286082 | 12/1991 | Japan | 49/382 |
| 981553 | 12/1982 | U.S.S.R. | 49/193 |

Primary Examiner—Lowell A. Larson
Assistant Examiner—Donald M. Gurley
Attorney, Agent, or Firm—Kanesaka & Takeuchi

[57] ABSTRACT

A lid operating mechanism for opening and closing a lid body from left and right sides of a box body includes left and right side hinge pins provided along left and right side edges of the lid body for movement between a projecting position and a retract position; left and right side operation buttons provided within the lid body for sliding; and left and right side cable means for directly connecting the left and right side hinge pins and the left and right side operating buttons, respectively, and having a first section extending in the widthwise direction and a second section extending in a lengthwise direction of the lid body so that when the left or right side operating button is depressed into the opening position, the left or right side cable means pulls the left or right side hinge pins into the retracted position to thereby allow opening of the lid body about the right or left side hinge pins.

8 Claims, 8 Drawing Sheets

LID OPENING/CLOSING APPARATUS

BACKGROUND OF THE INVENTION

This invention relates to a lid opening/closing apparatus capable of opening the lid of a console box from either side (driver's seat and front passenger seat) of an automobile for example.

Heretofore, as shown in Japanese Patent Laid-open Print No. 189249/1991, there is an apparatus of this type comprising two pairs of rods which protrude or retract from the side end face of a lid body being connected with a knob (operation section) disposed on the top face of the lid body by means of a cam and, when protruded, engage with a hole at the opening edge part of a console box, retracting either one pair of rods of the two pairs of rods into the lid body according to the operating direction of the above knob, and opening the lid body to a prescribed side with the remaining rods as the rocking axis (hinge).

However, the above conventional opening/closing apparatus is to open the lid in both directions by operating two pairs of rods by means of one knob. When the knob which was pressed in one direction to open the lid body in one direction was returned to the other direction after opening the lid body, the rod which was operating as the hinge was retracted and the lid body was separated from the console box.

As the movement of the knob is linked with the movement of the rod by the cam which is slidably contacted, force for pressing the knob and stroke required for opening the lid body were hardly set to an appropriate value respectively.

Specifically, when the force pressing the knob is principally determined by the specification of a spring energizing the rod and an inclination of the slidably contacting face of the cam and rod, by setting the stroke to a desired value according to the inclination of the slidably contacting face and by determining the specification (such as spring constant) of the above spring by considering the set inclination, the force pressing the knob can be set to a desired value.

But, in the above structure, there is an indispensable friction between the rod and the cam. The resistance by this friction varies depending on the condition of the slidably contacting face and increases as the above inclination is increased with respect to the moving direction of the knob in order to decrease the operation stroke of the knob. Therefore, it is actually difficult to set the operating force of the knob to a certain value by designing.

This invention has been completed by paying attention to the above problems of conventional techniques and aims to provide a lid opening/closing apparatus which has little possibility that the lid body is removed when the lid body is opened, and operating force and operating stroke can be easily set, and opening and closing can be made easily and surely.

SUMMARY OF THE INVENTION

To complete the above objects, this invention has the following points.

1. A lid opening/closing apparatus capable of opening or closing lid body (2) from any side of right and left or front and rear comprising:

each hinge pin disposed to become a rocking axis when opening or closing the lid body (2) with its either end as a free end and forming a pair of axes by energizing in the projecting direction toward an end opposite to the above end, each operation button provided on the lid body slidably corresponding to each pair of the above each hinge pin, and tension cables (17a, 17b, 18a, 18b) connecting the above each operation button with each corresponding hinge pin, so that when the above each operation button is pressed in one direction to slide to the engagement releasing position, hinge pins other than those forming axis are pulled to disappear (retract) in the lid body (2).

2. A lid opening/closing apparatus capable of opening or closing lid body (2) from either side of right and left comprising:

a pair of left side hinge pins (11a, 11b) disposed to freely project or disappear by aligning an axis to left end on front and rear end faces of the lid body (2), rotatably fitted in an axis bearing hole formed at the left end of front and rear inner faces of the opening to which the lid body is attached in the projected state, forming a rocking axis when opening the lid body (2) from right side, a pair of right side hinge pins (12a, 12b) disposed to freely project or disappear by aligning an axis to right end on front and rear end faces of the lid body, rotatably fitted in an axis bearing hole formed at the right end of front and rear inner faces of the opening to which the lid body is attached in the projected state, forming a rocking axis when opening the lid body (2) from left side, energizing members (13a, 13b, 14a, 14b) disposed within the lid body (2) and energizing the above left side hinge pins (11a, 11b) and right side hinge pins (12a, 12b) toward the projecting direction, left side operation button (15) and right side operation button 16 disposed on the lid body (2) slidably corresponding to each pair of the above left side hinge pins (11a, 11b) and right side hinge pins (12a, 12b), and tension cables (17a, 17b, 18a, 18b) connecting the above left side operation button (15) or right side operation button (16) with the corresponding left side hinge pin (11a, 11b) or right side hinge pin (12a, 12b), so that when the left side operation button (15) or right side operation button (16) is respectively pressed in one direction to slide to the engagement releasing position, a pair of the above left side hinge pins (11a, 11b) or right side hinge pins (12a, 12b) is pulled to disappear in the lid body (2).

3. A lid opening/closing apparatus according to the above 1, wherein the above left side operation button (15) or right side operation button is disposed at the left side or right side end of the lid body (2) with the sliding direction determined to be right and left directions along the top face of the lid body, the tension cables (17a, 17b, 18a, 18b) are routed from the right and left end sides of the lid body to the side part of the above left side operation button (15) or right side operation button (16) so that the above one direction pushes the left side operation button (15) or right side operation button (16) into the lid body, within the above lid body (2) is disposed stoppers (24, 25) to restrict the sliding stroke toward outside of the above left side operation button (15) or right side operation button (16), so that the above left side operation button (15) or right side operation button (16) does not protrude from the right and left end faces of the lid body (2).

4. A lid opening/closing apparatus according to the above 3, wherein the above tension cables (17a, 17b, 18a, 18b) have a part reciprocally arranged in parallel to the moving stroke of the above left side operation button or right side operation button, so that the displacement stroke of the above tension cables with respect to the moving stroke of the above each operation button is increased.

5. A lid opening/closing apparatus according to the above 3, wherein the above lid body (2) is provided with left side engaging members (19, 60) and right side engaging members (20, 60) to engage with the above left side operation button (15) or right side operation button (16) pressed to the above engagement releasing position to prevent the sliding to the other direction, the above left side operation button (15) and right side operation button (16) are disposed at the same position in the front and rear directions of the lid body (2), between the left side operation button (15) and right side operation button (16) in the lid body (2) is disposed rod (21) freely slidable in the same direction with the operation buttons (15, 16) and having a length substantially contacting with the end face inside the operation buttons (15, 16) when either of the operation buttons (15, 16) slides to the above engagement releasing position.

6. A lid opening/closing apparatus according to the above 3, wherein the above left side engaging members (19, 50) or right side engaging members (20, 60) are disposed to freely oscillate below the corresponding left side operation button (15) or right side operation button (16) and one end side is energized to engage with the recess of the lower face of the above left side operation button (15) or right side operation button (16) which is moved to the above engagement releasing position, and comprises rocking members (19, 20, 51, 61) to oscillate to the side the above engagement is released with the other end side pushed to the opening end face to which the lid body (2) is attached when the lid body (2) is closed.

7. A lid opening/closing apparatus capable of opening lid body (2) from either side of right and left, comprising a pair of left side hinge pins (11a, 11b) disposed to freely project or disappear by aligning an axis to left end on front and rear end faces of the lid body (2), rotatably fitted in an axis bearing hole formed at the left end of front and rear inner faces of the opening to which the lid body is attached in the projected state, forming a rocking axis when opening the lid body (2) from right side, a pair of right side hinge pins (12a, 12b) disposed to freely project or disappear by aligning an axis to right end on front and rear end faces of the lid body, rotatably fitted in an axis bearing hole formed at the right end of front and rear inner faces of the opening to which the lid body is attached in the projected state, forming a rocking axis when opening the lid body (2) from left side, energizing members (13a, 13b, 14a, 14b) disposed within the lid body (2) and energizing the above left side hinge pins (11a, 11b) and right side hinge pins (12a, 12b) in the projecting direction, left side operation button (15) and right side operation button (16) disposed on both sides of right and left at the same position in the front and rear directions of the lid body (2) and freely slidable to right and left directions, tension cables (17a, 17b, 18a, 18b) to link the above left side operation button (15) or right side operation button (16) with the left side hinge pins (11a, 11b) or right side hinge pins (12a, 12b), so that the above left side hinge pins (11a, 11b) or right side hinge pins (12a, 12b) are pulled to disappear in the lid body (2) when the left side operation button (15) or right side operation button (16) is pushed inward and slid to the engagement releasing position, left side engaging members (19, 50) and right side engaging members (20, 60) disposed on the lid body (2), engaged with the above left side operation button (15) or right side operation button (16) pushed to the engaging position before the above engagement releasing position, and prevent the button from sliding outward, and rod (21) disposed to freely slide to right and left between the left side operation button (15) and right side operation button (16) in the lid body (2), and has a length to prevent the operation buttons (15, 16) from sliding to the inner side beyond the engagement releasing position when one of the operation buttons (15, 16) is slid to the above engaging position, both ends come to contact with the inner end face of the operation buttons (15, 16).

8. A lid opening/closing apparatus according to the above 7, wherein the lower surface side of the above axis bearing hole consists of retaining member (70) which is freely movable vertically and energized upwardly, so that the lid body (2) can be slightly pushed down in the closing direction under the state that the above left side hinge pin and right side hinge pin are fitted in the above axis bearing hole, and the above left side engaging members (11a, 11b) or right side engaging members (20, 60) are disposed to freely oscillate below the above left side operation button (15) or right side operation button and energized to engage with the recess of the lower face of the above left side operation button (15) or right side operation button (16) with one end side moved to the above engaging position, and consists of a rocking member which oscillates to the side releasing the above engagement with the other end side pushed to the opening end face to which the lid body (2) is attached when the lid body (2) is pushed down by lowering the above retaining member (70).

DETAILED DESCRIPTION OF THE INVENTION

Figure 1:
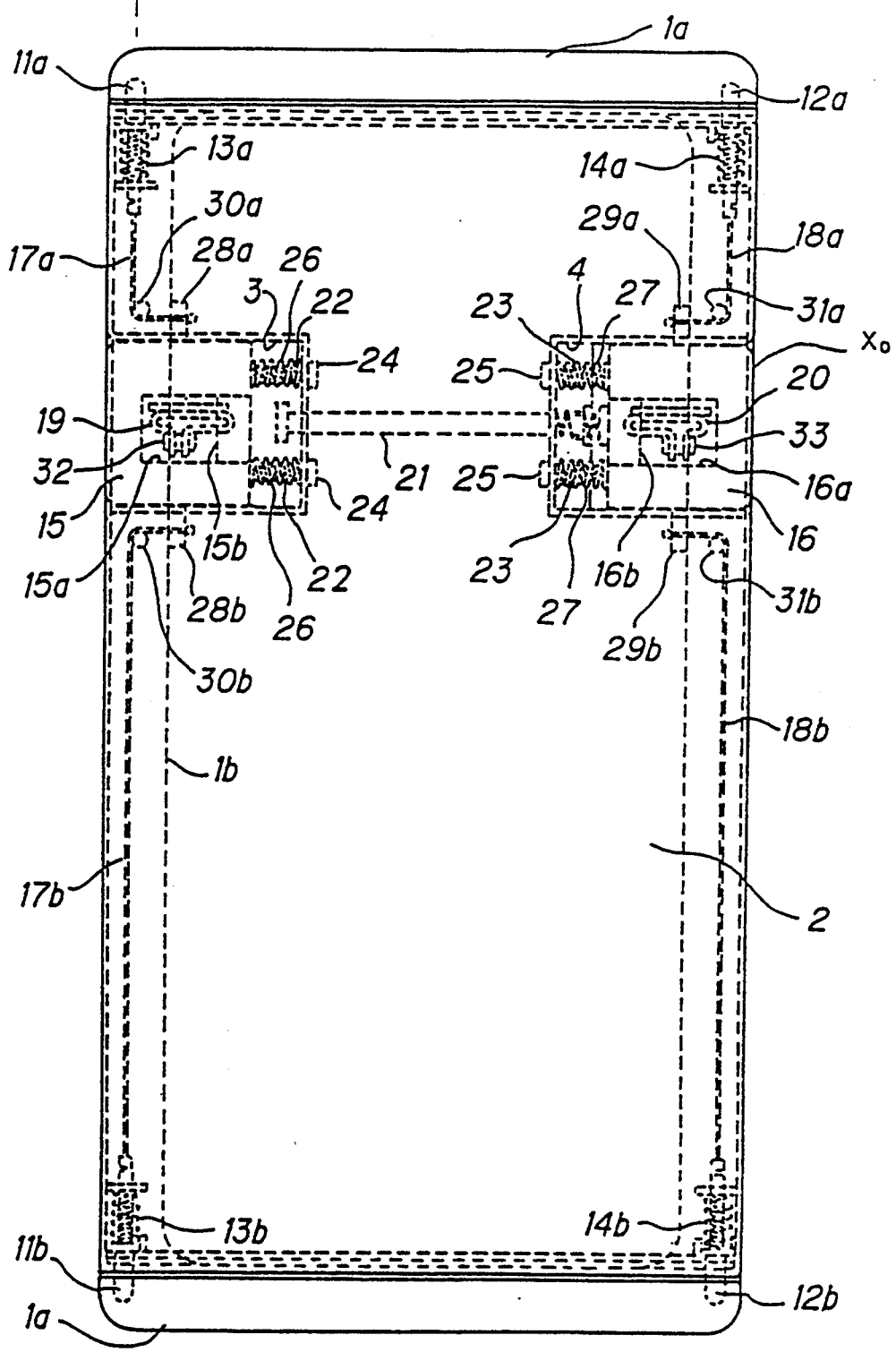
FIG. 1 is a plan View showing the state that the operation button is not pushed in the first example of this invention.

With the lid opening/closing apparatus of this invention, the lid body (2) is attached to the opening, two pairs of hinge pins (11a, 11b, 12a, 12b) are in the state fitted to the axis bearing hole of the above opening edge (1a), then by the force of energizing members (13a, 13b, 14a, 14b) which energize the hinge pins to the fitting side, the state that the lid body is closed is retained.

To open the lid body (2), a hand is placed near the operation button (15 or 16) on the side opposite from the side to be opened and the operation button (15 or 16) is pressed with a finger of the hand and the lid body is pulled, then the lid body can be opened readily. For example, when the right side of the lid body (2) is to be opened toward the left side, a hand is placed near the right side operation button (16) on the right end of the lid body (2) and the right side operation button (16) is pressed with the finger of that hand and the lid body is pulled, thus it can be opened readily. That is to say, when the right side operation button (16) is pushed to the engagement releasing position, the right side hinge pins (12a, 12b) alone are pulled via the tension cables (18a, 18b) and pulled into the lid body (2) respectively, so that the lid body (2) can be opened from right side with the left side hinge pins (11a, 11b) as the rocking axis.

The remaining hinge pins remain engaged with the axis bearing hole of the opening edge to which the lid body is attached by the action of the energizing means (14a, 14b or 13a, 13b) unless the other operation button (16 or 15) is operated. Therefore, even when an abnormal operation is made to return the other operation button to the opposite direction after opening the lid body, the lid body does not come off.

And, when the above operation button is disposed at the end of the side that the above corresponding hinge pin is provided between the right and left ends of the lid body, its operation direction is the direction to push into the lid body, and restricted so that it does not protrude from the end face of right and left of the lid body, the operation button can be pressed with a finger of the hand placed to open the lid body, so that the lid body can be opened by a single operation, and appearance is good because the operation button is always in the state enclosed in the lid body.

When engaging members (19, 20, 50, 60) are disposed to prevent the operation button pressed in the engagement releasing position from sliding in the returning direction and rod (21) with a length with its both ends to substantially contact with the end face of the inside of the two operation buttons when one of the operation buttons slides to the above engagement releasing position, when the one operation button is operated and retained at the engagement releasing position, the other operation button is prevented by the above rod and cannot move to the direction toward the engagement releasing position unless the engagement of the above engaging members is released. Therefore, even when the other operation button is pressed after the lid body is opened by the operation of one operation button, the hinge pin as a rotating axis does not retract and a possibility of separation of the lid body can be completely remedied.

When the above engaging members comprise rocking members (19, 20, 51, 61) which oscillate to release the engagement because the other end side is pushed against the opening end (1b) to which the lid body is attached when the lid body is closed, mere operation to close the lid body automatically releases the retaining state of the operation button to the engagement releasing position, and the hinge pin retracted in the lid body projects and fits in the hole of the opening edge, and two pairs of hinge pins automatically return to the engaged state (the above retention state).

Fitting with the above left side operation button or right side operation button pushed to the fitting position before the engagement releasing position, the left side engaging member and right side engaging member preventing its sliding outwardly, then when one of the operation buttons (15, 16) is pushed to the engagement releasing position, since the engaging members (19, 20) are surely engaged with one of the operation buttons (15, 16) at the engaging position, when the lid body (2) is opened to either side by the above operation, one operation button (15 or 16) is retained at the engaged position, and under this condition, rod (21) contacting with the inside of the both operation buttons (15, 16) surely prevents the pushing operation of the other operation button (16 or 15) to the engagement releasing position and after. Therefore, after the lid body (2) is opened by the operation of one operation button (15 or 16), even if the other operation button (16 or 15) is under a load, it is impossible that the hinge pin which is to be a rotating axis is retracted, so that a possibility that the lid body (2) is separated is completely remedied.

And, the lower face side of the above axis bearing hole is structured by retention member (70) which is freely movable vertically and energized upwardly so that the lid body (2) in the closed state can be slightly pushed down to the closing direction, and the above engaging members (19, 20) consist of rocking members (19, 20) releasing the engagement by oscillating when the other end side is pushed by the opening end (1b) when the lid body (2) is slightly pushed down. Then, by the operation that the lid body (2) is closed and further pushed doom, the retaining condition to the engaging position of the operation buttons (15, 16) is automatically released, and hinge pins (11a, 11b, 12a, 12b) completely protrude to fit in the axis bearing hole of the opening end, then two pairs of hinge pins (11a, 11b, 12a, 12b) return automatically to the fitted state (the above closed state).

EXAMPLES

Now, the first example of this invention will be described based on FIG. 1 through FIG. 4.

Figure 2:
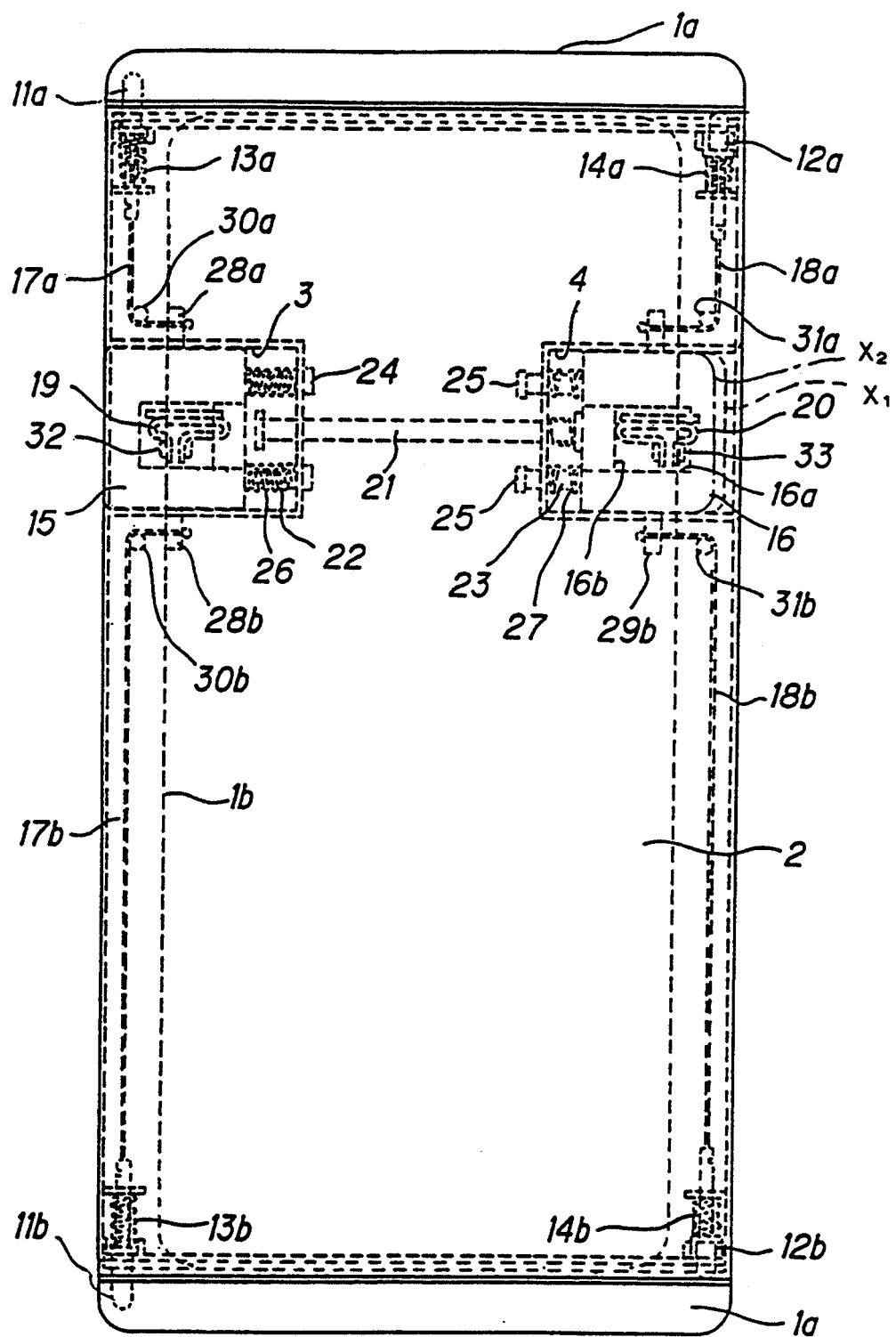
FIG. 2 is a plan view showing the state that one operation button is pushed in the first example of this invention.
Figure 3:
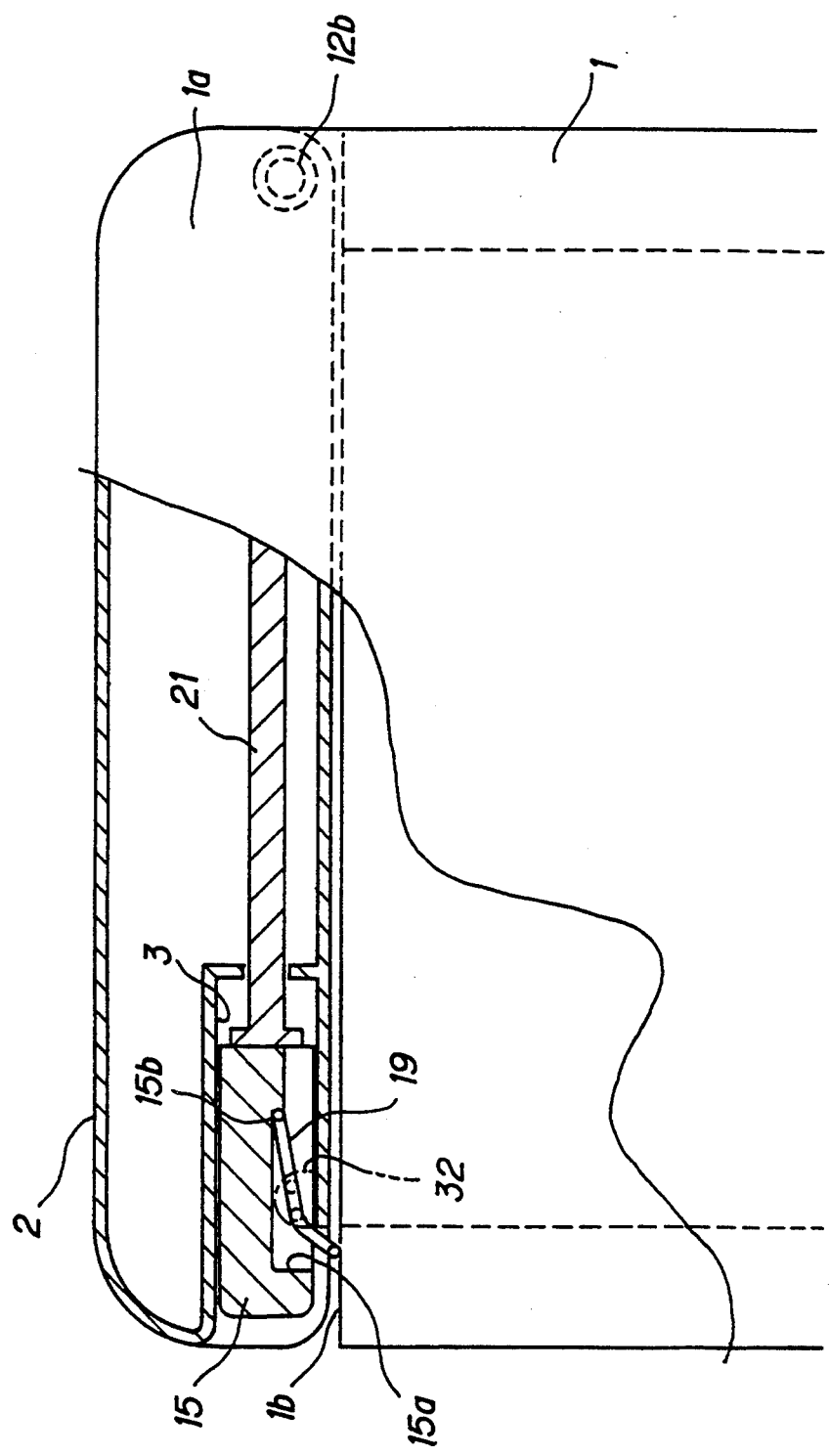
FIG. 3 is a side view showing the state that the lid is closed with its part broken in the first example of this invention.
Figure 4:
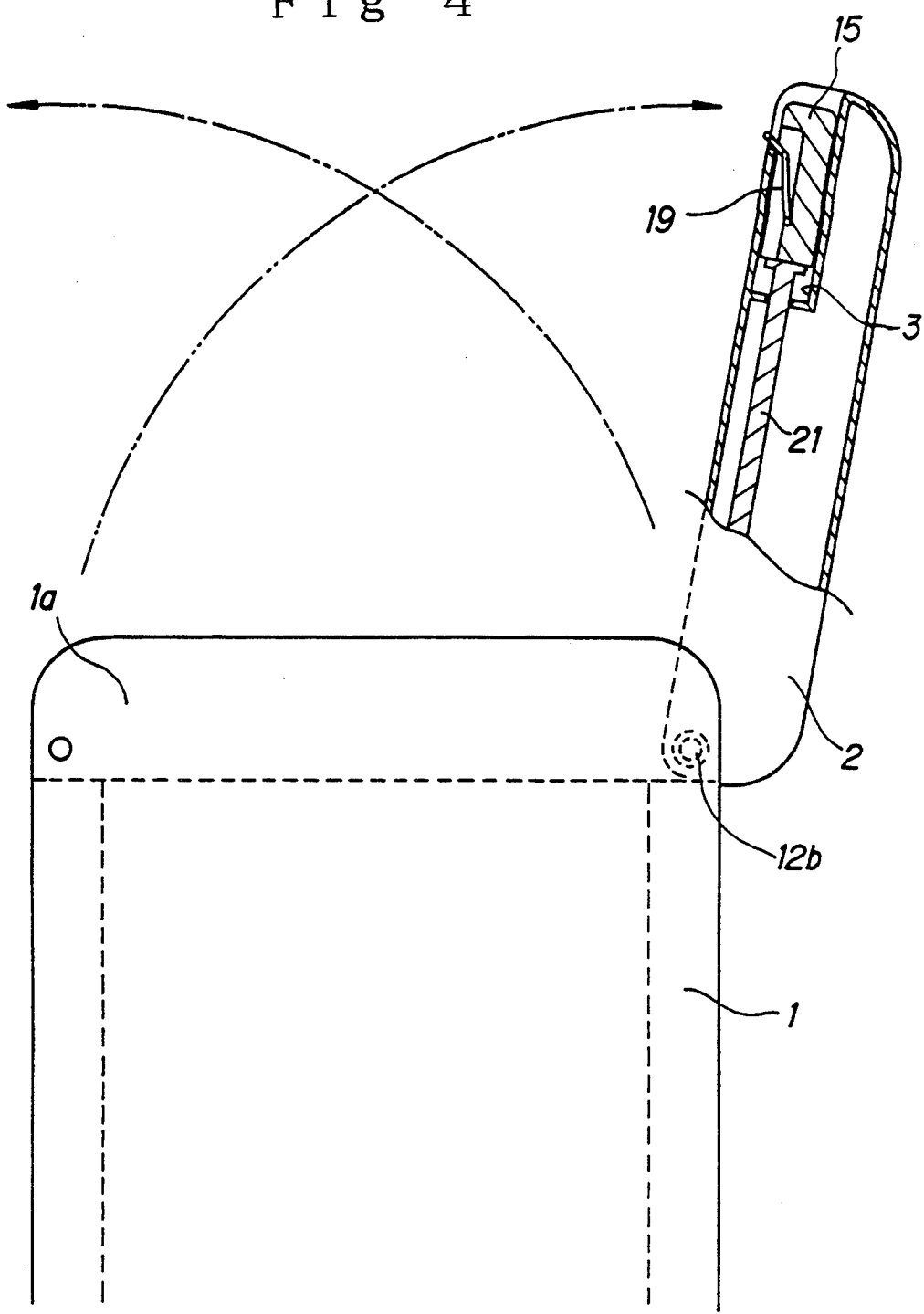
FIG. 4 is a side view showing the state that the lid is opened with its part broken in the first example of this invention.

FIG. 1 and FIG. 2 are plan views of a console box to which the lid opening/closing apparatus of this example is applied, and FIG. 3 and FIG. 4 are partly broken side views of this console box. This console box is for example made of synthetic resin and consists of a rectangular parallelepiped box body 1 and a lid body 2 to close the top opening of the box body 1.

And, the lid opening/closing apparatus of this example consists of left side hinge pins 11a, 11b disposed to freely project and disappear with an axis aligned to the left end in both end faces of the front and rear direction (vertical direction in FIG. 1) of the lid body 2, right side hinge pins 12a, 12b disposed to freely project and disappear with an axis aligned to the right end in the above both end faces, compression coil springs 13a, 13b, 14a, 14b (energizing members) to energize the hinge pins to the projecting direction, left side operation button 15 or right side operation button 16 disposed on the lid body to be freely slidable corresponding to each pair of the above hinge pins, tension cables 17a, 17b, 18a, 18b to respectively link the operation buttons 15, 16 with the two corresponding hinge pins, left side engaging member 19 or right side engaging member 20 to respectively engage with the operation buttons 15, 16 pushed to the engagement releasing position to be described afterward to prevent the sliding to the returning direction, and rod 21 disposed to be freely slidable between the above two operation buttons 15, 16 and to prevent the simultaneous operation.

The left side hinge pins 11a, 11b or right side hinge pins 12a, 12b are engaged to be freely rotatable with the axis bearing hole (not shown) respectively formed at both inner faces of the edge 1a positioned in front and rear of the upper opening of the box body 1 in the projected state.

The left side operation button 15 or right side operation button 16 is disposed at the end (in this case, the left side operation button 15 is at the left end and the right side operation button 16 is at the right end) of the side the corresponding hinge pin is disposed of the right and left ends of the lid body 2 and the sliding direction is determined to be in the right and left directions along the top face of the lid body. That is to say, on the lower face side of the right and left ends of the lid body 2, sectional square recesses 3, 4 extending toward the inner direction along the top face of the lid body 2 are formed as positioned at the same position of the front and rear directions of the lid body 2, and the respective operation buttons 15, 16 are engaged in these recesses 3, 4 so as to be freely slidable.

At the both ends of the end face in the inner part of the left side operation button 15 or right side operation button 16, sliding axes 22, 23 extending through the walls in the inner part of the recesses 3, 4 are formed, and the large diameter sections at the tips of the sliding axes 22, 23 contact with the walls in the inner parts of the recesses 3, 4 and form stoppers 24, 25 to restrict the sliding stroke toward outside of the operation buttons 15, 16, so that the operation buttons 15, 16 do not protrude from the end faces at right and left of the lid body 2.

And, on the periphery of the sliding axes 22, 23 and between the operation buttons 15, 16 and the walls in the inner parts of the recesses 3, 4, compression coil springs 26, 27 are attached to energize the operation buttons 15, 16 outwardly. From the both side faces of the left side operation button 15 or right side operation button 16, projections 28a, 28b, 29a, 29b are formed to extend through the side walls of the recesses 3, 4, so that one end of the respective tension cables 17a, 17b, 18a, 18b is fixed. At the side walls of the recesses 3, 4, on the parts where the projections 28a, 28b, 29a, 29b pierce, a long hole (not shown) is formed in the sliding direction of the operation buttons 15, 16 to prevent interference.

The sliding stroke of the operation buttons 15, 16 is set to a value beyond the stroke that each hinge pin is pulled out completely from the above axis bearing hole and disappears in the lid body 2, and the position of the operation buttons 15, 16 when each hinge pin is completely pulled out from the above axis bearing hole to disappear in the lid body 2 is the above engagement releasing position. Further, on the lower face sides of the operation buttons 15, 16, recesses 15a, 16a in which the left side engaging member 19 or right side engaging member 20 is disposed, and within the recesses 15a, 16a, step parts 15b, 16b to which the left side engaging member 19 or right side engaging member 20 is engaged are formed.

The tension cables 17a, 17b, 18a, 18b are routed from the end side at right and left of the lid body and attached to the projections 28a, 28b, 29a, 29b of the operation buttons 15, 16, so that the operation direction of the operation buttons 15, 16 for releasing the engagement of the corresponding hinge pin becomes the direction to push them into the lid body 2.

Specifically, on the respective both sides of the recess 3, 4 at the end of right and left of the lid body 2, slidable contact pins 30a, 30b, 31a, 31b which slidably contact with the tension cable 17a, 17b, 18a, 18b are disposed at the position on the end side of the lid body 2 rather than the projections 28a, 28b, 29a, 29b, and the tension cables 17a, 17b, 18a, 18b are wound around the slidable contact pins 30a, 30b, 31a, 31b and routed, and attached to the projections 28a, 28b, 29a, 29b from the end side of the lid body 2.

Thus, a means to lay the tension cables 17a, 17b, 18a, 18b is not limited to the above slidable contact pin but a freely rotatable pulley may be used. Length of the tension cables 17a, 17b, 18a, 18b is set to a value so that they are tense without slack as shown in FIG. 1 when the left side hinge pins 11a, 11b or right side hinge pins 12a, 12b engage with the above axis bearing hole and the left side operation button 15 or right side operation button 16 is in a free state (stoppers 24, 25 are effective and the end face of the left side operation button 15 or right side operation button 16 agrees to the position of the end face of the lid body 2). Further, the material of the tension cables 17a, 17b, 18a, 18b may be anything as far as it is fully flexible and has less elongation. For example, steel wire, piano wire, silk yarn or the like may be used.

The left side engaging men, her 19 or right side engaging member 20 has a tension cable such as steel cable bent in the shape of a narrow loop and the both ends of the tension cable elongated in parallel in cross direction, and each end is inserted in and supported by two cross holes of projections 32, 33 formed on the bottom face of the above recesses 3, 4 to vertically oscillate accompanying the deformation of the whole.

The left side engaging member 19 or right side engaging member 20 has its attaching position to the projections 32, 33 set, so that one end on the outside of the looped part is bend downwardly toward the opening end face 1b of the box body 1 as shown in FIG. 3, and in the natural state (not deformed state), the one end extends downwardly from the lower face of the lid body 2 and the other end of the inside faces upward. Thus, when the left side operation button 15 or right side operation button 16 is pushed into the position that the engagement of the hinge pin is disengaged (hereinafter called the engagement releasing position), the other end of the left side engaging member 19 or right side engaging member 20 is automatically engaged with the above step parts 15b, 16b.

The rod 21 has length and is disposed so that its both ends pierce the walls in the inner parts of the above recesses 3, 4 and it is freely slidable in the same direction with the operation buttons 15, 16, and when one of the operation buttons 15, 16 slides to the engagement releasing position, the both ends almost contact with the end face in the inside of the two operation buttons 15, 16. Compression spring 35 is disposed between one end of the rod 21 and the wall forming the bottom face of the recess 4 to prevent this rod from moving freely. The length almost to engage means that it is not necessary to always contact, and at least in the state that one operation button is pushed in to the above engagement releasing position and prevented from sliding in the returning direction by the above engaging member, the contact with the end face of the rod 21 is made before the other operation button is slid to the engagement releasing position.

Now, the action of the above first example will be described.

First, when the lid body 2 attaches to the top opening of the box body 1 and the left side hinge pins 11a, 11b and right side hinge pins 12a, 12b are in the state engaged in the axis bearing hole of the opening end 1a, as far as the left side operation button 15 or right side operation button 16 is not pushed by the force of the springs 13a, 13b, 14a, 14b energizing the hinge pins to the engaging side, the state that the lid body 2 closes the opening. (At the time, the left side engaging member 19 or right side engaging member 20 is in the deformed state because the end part of the outside contacts with the top opening end face 1b of the box body 1 and pushed into the lid body 2, and the end part of the inside is in the state put on the step parts 15b, 16b of the left side operation button 15 or right side operation button 16.)

And, when the lid body 2 is to be opened from the right side for example, a hand is put near the right side operation button of the right end of the lid body 2 and the right side operation button 16 is pushed by a finger of the hand and the lid body is pulled, thus the lid body can be opened with a single operation. That is to say, as shown in FIG. 2, when the right side operation button 16 is pushed in to the engagement releasing position, the right side hinge pins 12a, 12b alone are pulled by the tension cables 18a, 18b and retracted into the lid body 2, so that the lid body 2 can be opened from the right side with the left side hinge pins 11a, 11b as the oscillating axis.

On the other hand, when a hand is put near the left side operation button of the left end of the lid body 2 and the left side operation button 15 is pushed to the engagement releasing position by a finger of the hand, the left side hinge pins 11a, 11b alone are similarly pulled by the tension cables 17a, 17b and retracted into the lid body 2, thus the lid body 2 can be opened from the left side with a single operation with the right side hinge pins 12a, 12b as the oscillating axis as shown in FIG. 4.

At this time, when the left side operation button 15 is pushed in to the engagement releasing position to open the lid body 2 from the left side for example, the left side engaging member 19 automatically oscillates in the counterclockwise direction by the restoring force from the deformed state as shown in FIG. 3 and the end part of the inside of the left side engaging member 19 automatically engages with the step part of the left side operation button 15 to prevent the returning of the left side operation button 15. And, the rod 21 stands between the two operation buttons 15, 16 and, even if an external force is applied to the right side operation button 16 in the pushing direction, the sliding of the right side operation button 16 is prevented. Therefore, when the lid body 2 is once opened to either side, the retracted hinge pin on the opened side does not project or the lid body 2 is not separated by the retraction of the remaining hinge pin supporting the lid body 2.

And, to close the lid body 2 to the original state, it is sufficient by tilting the opened lid body 2 to contact the top opening end face 1b of the box body 1. Then, the end part of the outside of the engaging men, her on the opened side is pushed by this opened end face to oscillate and the engagement of the end part of the inside with the above step part of the operation button is released, and the aforementioned lid body 2 returns to the state closing the opening.

Specifically, when the lid body 2 opened from the left side is closed for example, the left side engaging member 19 is pushed by the opening end face of the box body 1 at the end part of the outside and oscillated clockwise as shown in FIG. 3, and the engagement of the end part of the outside of the left side engaging member 19 with the step part 15b is released. Therefore, the left side operation button 15 or left side hinge pins 11a, 11b are returned to the original position by the restoring force of the springs 13a, 13b or spring 26, and the left side hinge pins 11a, 11b are engaged with the axis bearing hole of the inner face of the edge part 1a.

Thus, in the above lid opening/closing apparatus, the lid body 2 can be opened and closed to either side of right and left with a single operation, and the lid body 2 is never separated. Because, the left side operation button 15 or right side operation button 16 is separately disposed on right and left, and possibility of pressing the opposite operation button is quite low to open the lid body 2 to either side, and even if the operation button on the opposite side is pushed, the slide of the operation button to the engagement releasing position is impossible by the action of the aforementioned left side engaging member 19 or right side engaging member 20 and the rod 21. Therefore, the left side hinge pins 11a, 11b or right side hinge pins 12a, 12b do not become a state retracted And, in the above lid opening/closing apparatus, the necessary stroke (a sliding distance to the engagement releasing position) of the left side operation button or right side operation button is principally determined by the routing of the tension cables 17a, 17b, 18a, 18b (equal to the stroke of each hinge pin in the above example), and the pushing pressure needed to slide the left side operation button 15 or right side operation button 16 is substantially equal to the restoring force of the springs 13a, 13b or spring 26 (particularly, when a pulley is used instead of the slidable contact pins 28a, 29a, etc., the resistance force by friction becomes substantially nil.) Therefore, it is quite easy to set the operation stroke and operation force to respective optimum values by designing.

And respective hinge pin 11a, 11b, 12a, 12b and operation button 15, 16 are always accommodated inside and not exposed outside when the lid body 2 is opened. Therefore, appearance is good. Further, since the tension cables 17a, 17b, 18a, 18b are used as the operation power transmission member to protrude or retract the hinges, the structure can be made simple and its weight is light.

Figure 5:
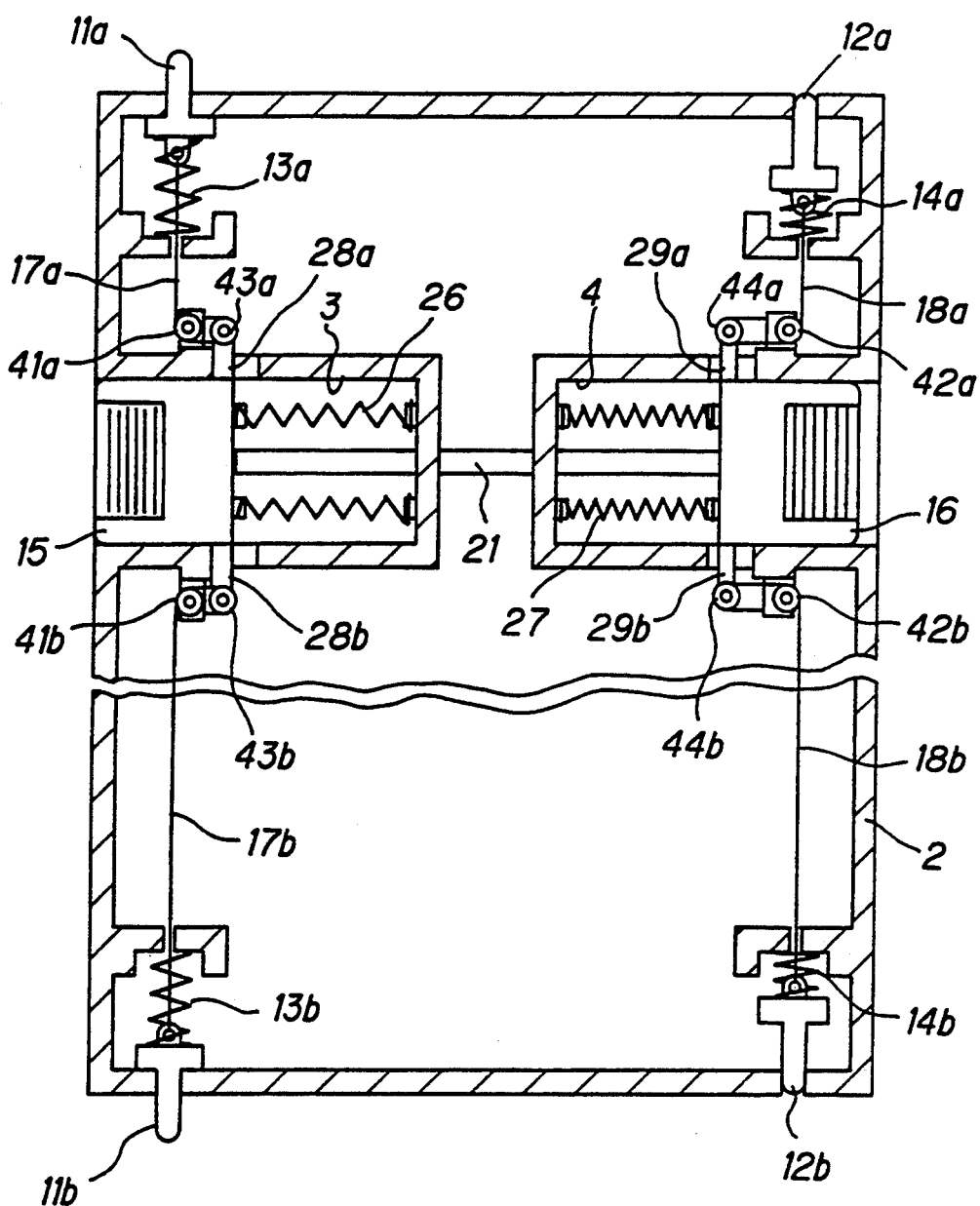
FIG. 5 is a horizontal cross section showing the second example of this invention.
Figure 6:
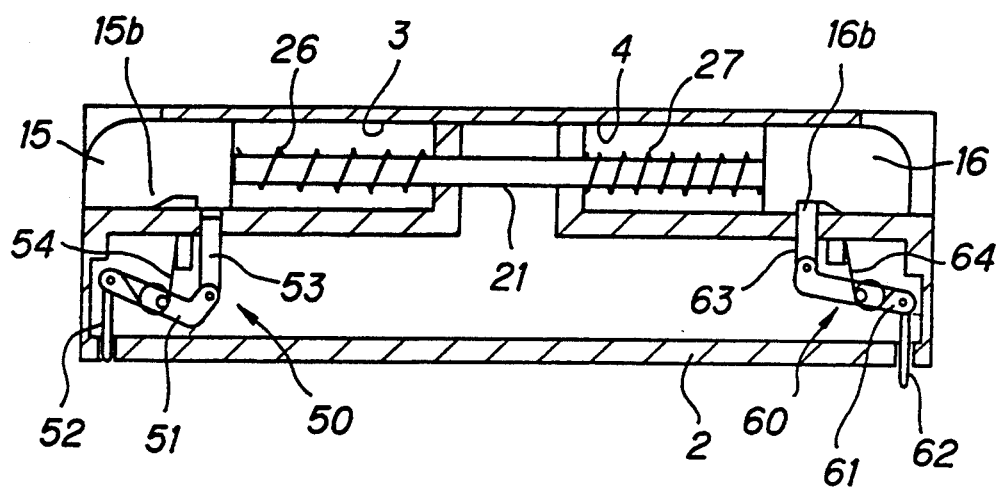
FIG. 6 is a vertical section showing the second example of this invention.
Figure 7:
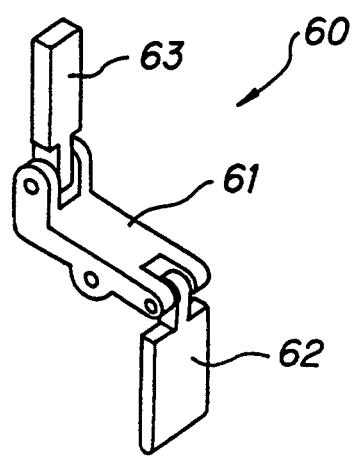
FIG. 7 is a perspective view showing the engaging member in the second example of this invention.

Now, the second example of this invention will be described with reference to FIGS. 5 to 7. The same reference numerals are given to the same parts with those of the first example and the repeated description is omitted.

Characteristics of the second example include the attachment of the tension cables 17a, 17b, 18a, 18b to the left side operation button or right side operation button.

That is to say, pulleys 41a, 41b, 42a, 42b are disposed on the side wall of recesses 3, 4 instead of the above slidable contact pins 28a, 28b, 29a, 29b, and pulleys 43a, 43b, 44a, 44b are attached to projections 28a, 28b, 29a, 29b on the side face of the left side operation button 15 or right side operation button 16. And, the end part of the left side operation button 15 or right side operation button 16 side of the tension cables 17a, 17b, 18a, 18b is wound around these pulleys as shown in FIG. 5, and its end is fixed to the lid body 2.

Then, as to the structure of the engaging members, the engaging members 50, 60 of the second example consist of three links. Specifically, right side engaging member 60 is connected to be freely rocking to rocking link 61 attached to freely rock vertically to the lower position of the recess 4 in the lid body 2 and the end part of the outside of the rocking link 61, and its leading end is connected to freely rock to the attaching link 62 designed to freely project from the lower end of the lid body 2 with the rocking of the rocking link 61 and the end part of the inside of the rocking link 61, and the leading edge consists of engaging link 63 freely projected within the recess 4 with the rocking of the rocking link 61, and the rocking link 61 is energized in the clockwise direction by spring 64.

And, similarly, the left side engaging member 50 consists of rocking link 51, attaching link 52 and engaging link 53, and the rocking link 51 is energized in the counterclockwise direction by the spring 54.

With the lid opening/closing apparatus of the second example, by the similar single operation with the above first example, the lid body 2 can be opened to either side of right and left and the same effect can be attained, but what is characteristic is that the operation stroke of the left side operation button 15 or right side operation button 16 needed to open the lid body 2 is a half of the first example. That is to say, since each tension cable is routed and attached as described above, the relation in the moving amount of each hinge pin and each operation button becomes 2 to 1, and to release the engagement by retracting each hinge pin, it is sufficient by pushing the corresponding operation button for its half stroke.

The engaging members 50, 60 do not move accompanying the deformation like the aforementioned left side engaging member 19 or right side engaging member 20, and at the time of operation to open the lid, by the energizing force of the springs 54, 64, the leading end of the engaging links 53, 63 engages with the step parts 15b, 16b of the lower face of the left side operation button 15 or right side operation button 16 which came to the engagement releasing position with the rocking of the rocking links 51, 61. And, at the time of operation to close the lid, the attaching links 52, 62 are contacted and pushed to the opening end face of the box body, and with the rocking of the rocking links 51, 61, the engaging links 53, 63 are lowered and the engagement with the operation button is released.

In the second example, as the stopper to restrict the stroke so that the left side operation button 15 or right side operation button 16 does not project from the end face of the lid body 2, the side walls of the recesses 3, 4 of the lid body 2 in contact with the projections 28a, 28b, 29a, 29b at both sides of the left side operation button 15 or right side operation button 16 performs this function.

The third example of this invention will be described with reference to FIG. 1, FIG. 2, FIG. 8 and FIG. 9. The same reference numerals are given to the same parts with those of the first example and the repeated description is omitted.

Figure 8:
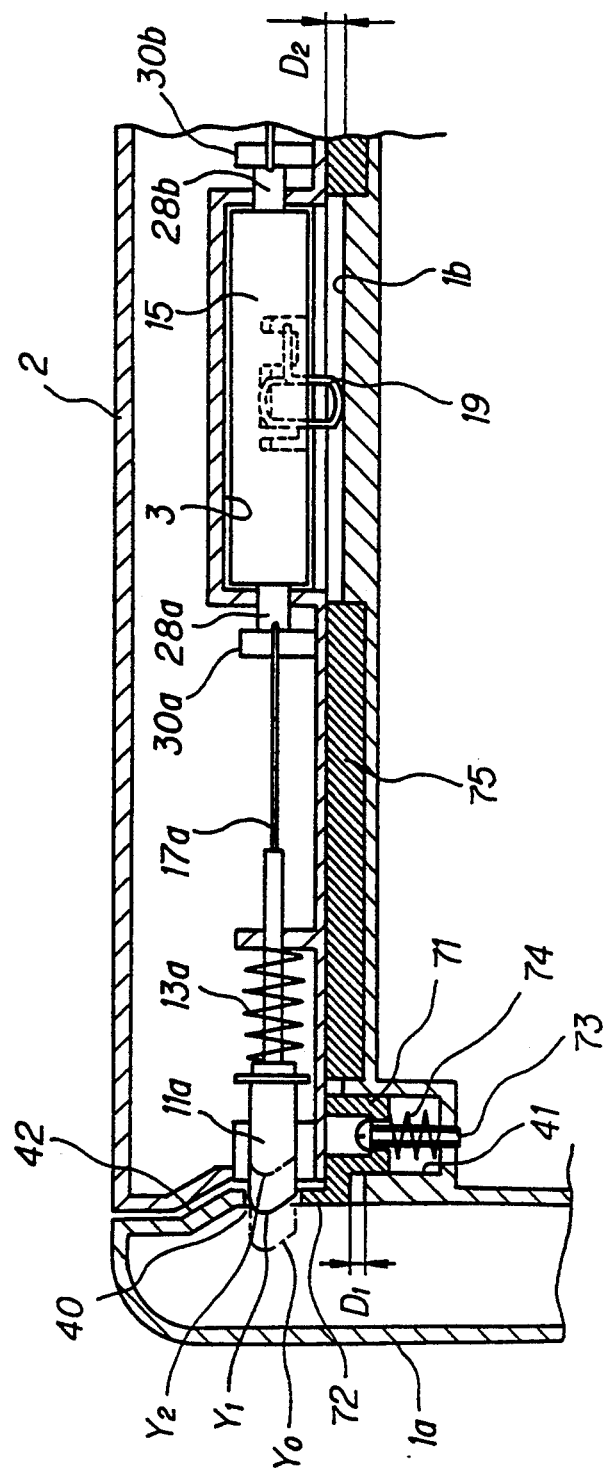
FIG. 8 is a cross section showing the position viewed at line 8 of FIG. 1 in the third example of this invention.
Figure 9:
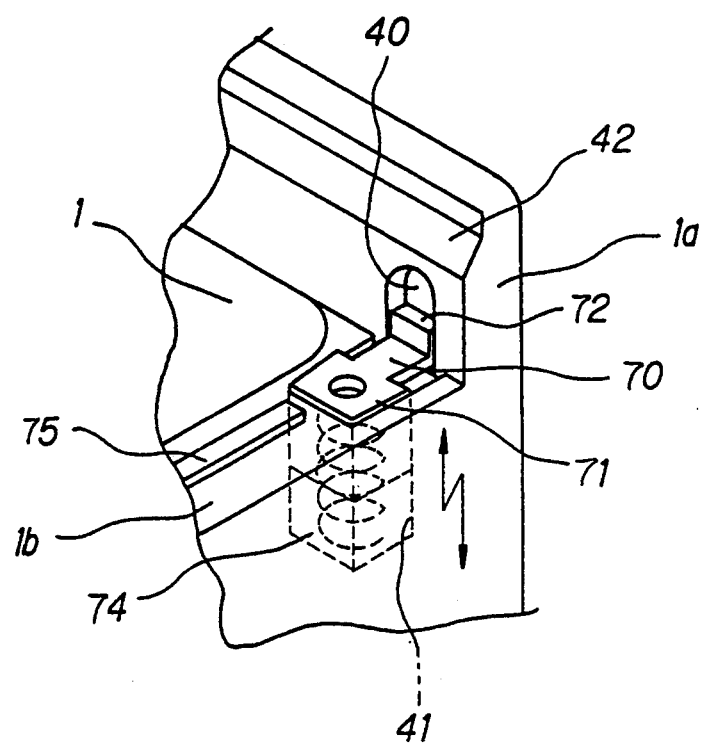
FIG. 9 is a perspective view showing the structure around the axis bearing hole of the lid opening/closing apparatus in the third example of this invention.

As shown in FIG. 8 and FIG. 9, the lid opening/closing apparatus has four axis bearing holes 40 to which the above hinge pins 11a, 11b, 12a, 12b fit in the both inner faces of the edge part 1a positioned in front and rear of the top opening in the box body 1 and the lower face side of these axis bearing holes is made of lid holder 70 (retaining member) which freely moves vertically.

The left side hinge pins 11a, 11b or right side hinge pins 12a, 12b are to freely engage rotatably to the above axis bearing hole 40 of the box body in the projected state, and disposed on the same axis and their leading end lower face side is cut in an inclined direction as shown in FIG. 8.

The sliding stroke of the operation buttons 15, 16 is set to a value beyond the stroke for retracting each hinge pin which is completely pulled out of the above axis bearing hole 40, into the lid body 2, and the position of the operation buttons 15, 16 when each hinge pin is completely pulled out of the above axis bearing hole and disappears in the lid body 2 is the engagement releasing position. That is to say, when the leading end of the operation buttons 15, 16 is pushed into the one dot and dash line position (engagement releasing position) shown by symbol X2 in FIG. 2, the leading end of each hinge pin is designed to be retracted to the position indicated by symbol Y2 in FIG. 8.

The left side engaging member 19 or right side engaging member 20 has one end of the outside of the looped part bent downward toward the opening end face 1b of the box body 1 as shown in FIGS. 3 and 4, and in the natural state (not deformed state), the attaching position to the projections 32, 33 is set so that this one end extends downward from the lower face of the lid body 2 and the other end of the inside directs upward. Thus, when the left side operation button 15 or right side operation button 16 is pushed to a prescribed engaging position, the other end of the left side engaging member 19 or right side engaging member 20 is automatically engaged with the above step parts 15b, 16b.

Here, the engaging position is a position in front of the above engagement releasing position where the engagement of the hinge pin is released. That is to say, when the leading end of the operation buttons 15, 16 is pushed into the position (engaging position) indicated by symbol X1 as shown in FIG. 2, the leading end of each hinge pin is at the position shown by symbol Y1 in FIG. 3, and each hinge pin is set engaged with the above axis bearing hole 40.

The rod 21 has a length and is disposed in the state that its both ends pierce the walls at the deep side of the above recesses 3, 4 and freely slidable in the same direction with the operation buttons 15, 16 and, when one of the operation buttons 15, 16 slides to the engaging position, both ends almost contact with the end face of the inside of the two operation buttons 15, 16. The compression spring 35 is disposed between one end of the rod 21 and the wall forming the inner face of the recess 4 to prevent the rod 21 from moving freely. The length to almost contact does not always mean that it is necessary to contact, and means to contact the end face of the rod 21 before the other operation button slides to the engagement releasing position under the state that one operation button is pushed into the above engaging position and the sliding in the returning direction by the above engaging member is prevented.

In this case, lid holder 70 consists of rectangular perallelepiped engaging part 71 and support 72 extending in the shape of L from one side of the top end of the engaging part 71 as shown in FIG. 8 and FIG. 9. This lid holder 70 is made to freely move vertically by engaging the engaging part 71 to square recess 41 formed at the position neighboring to each axis bearing hole 40 at the opening end face 1b of the box body 1, and the support 72 extends into the wall face of the edge part 1a of the box body 1 and forms the lower face of the axis bearing hole 40. And, this lid holder 70 is restricted its moving stroke upward by screw 73 driven in the bottom of the above recess 41 through the engaging part 71 and energized upward by the compression spring 74 disposed around the screw 73 and between the above engaging part 71 and the bottom of the recess 41.

The size of the axis bearing hole 40 in the vertical direction varies by the vertical movement of the lid holder 70, and the uppermost position of the lid holder 70 is set by the driving-in amount of the screw 73 so that the hinge pins 11a, 11b, 12a, 12b engage without free play in a small gap when the lid holder 70 is at the uppermost position.

And, a minute movement downward of the lid body 2 which is in the closed state by the lowering movement of the lid holder 70 become possible, but gap D1 or D2 (shown in FIG. 8) between the lid holder 70 or lid body 2 and the above opening end face 1b to determine the moving stroke of the lid body 2 to downward is designed to be a sufficient size to release the engagement to the above operation buttons 15, 16 by the engaging members 19, 20 being pushed by the above opening end face 1b and oscillated when the lid body 2 is pushed down by lowering the above lid holder 70.

Further, on the inner face of the top end of the edge 1a of the box body 1, inclined face 42 slanting to overhang downwardly at the position where the lower face of the leading end of each hinge pin positioned as indicated by the above symbol Y1 contacts as shown in FIG. 8. And, on the opening end face 1b of the box body 1, cushion 75 which is made of expandable resin for example and rich in elasticity is mounted, and a gap indicated by the above symbol D2 filled on most part excepting the section where the engaging members 19, 20 contact.

Now, the action of the third example will be described.

Similar to the first example shown in FIG. 1, when the lid body 2 is attached to the top opening of the box body and the left side hinge pins 11a, 11b and right side hinge pins 12a, 12b are in the state engaged with the axis bearing hole of the opening edge 1a, by the force of the springs 13a, 13b, 14a, 14b energizing these hinge pins toward the engaging side, the state that the opening is closed by the lid body 2 is retained unless the left side operation button 15 or right side operation button is pushed. At this time, the left side engaging men, bet 19 or right side engaging member 20 is in the state that its inner side edge is on the step parts 15b, 16b of the left side operation button 15 or right side operation button 16 and in the deformed state. And, the lid holder 70 is at the uppermost position and each hinge pin is retained without free play.

And, when the lid body 2 is to be opened from the right side for example, a hand is placed near the right side operation button 16 at the right end of the lid body 2, and the right side operation button 16 is pushed by a finger of the hand and the lid body is pulled, so that the lid body can be opened with a single operation. That is to say, when the right side operation button 16 is pushed in to the engagement releasing position X2 shown in FIG. 2, the right hinge pins 12a, 12b alone are pulled via the tension cables 18a, 18b and retracted to the position of the symbol Y2 in the lid body 2, so that the lid body 2 can be opened from right side with the left side hinge pins 11a, 11b as the axis.

For example, when the left side operation button 15 is pushed in to the engagement releasing position to open the lid body from left side, this left side operation button 15 passes through the engaging position without fail, and the left side engaging member 19 engages with the left side operation button 15 at the engaging position as shown in FIG. 3. That is to say, the left side engaging member is automatically oscillated counterclockwise by the restoring force from the deformed state as shown in FIG. 3, and the end of the inside of the left side engaging member 19 is automatically engaged with the step part 15b of the left side operation button and prevents the left side operation button 15 from returning to the outside beyond the engaging position. And, the rod 21 is between the two operation buttons 15, 16 and prevents the right side operation button 16 from sliding to the inside beyond the engagement releasing position even when the external force of the pushing direction is applied to the right side operation button 16.

Therefore, when the lid body 2 is once opened to either side, the hinge pin once retracted on the opened side does not project to the outside beyond the position (Y1) corresponding to the engaging position, and there is no possibility that the lid body 2 is separated as a result of retraction of the remaining hinge pins supporting the lid body 2. The same is applied to the case opening the lid body 2 from right side, and in this case, the engaging position is passed through in the process of pushing the right side operation button 16, and the right side engaging member 20 is engaged with the right side operation button as shown in FIG. 2, then the rod 21 acts similarly.

Then, to close the lid body 2 to the original state, the opened lid body 2 is simply fallen to close and pushed down to contact the top opening end face 1b of the box body (or to contact the support 72 of the lid holder 70 to the opening end face 1b). As the result, in the process of closing, the hinge pin on the opened side projecting to the position shown by the symbol Y1 (the position corresponding to the engaging position) contacts with the declined face 42 of the above box body 1 and is pushed in according to the inclination, then projects at the position of the axis bearing hole to smoothly engage with the axis bearing hole automatically.

And, when the lid body 2 is further lowered accompanying the lowering of lid holder 70 from this position, the end of the outside of the engaging member on the opened side is pushed to the opening end face 1b of the box body 1 and oscillates, and the engagement of the inside end with the above step part is released and the hinge pin returns to the completely engaged position indicated by symbol Y0, and when a hand is released, the lid body 2 returns to the ordinary closed position by the restoring force of the spring 74.

Specifically, when the opened lid body 2 is closed from left side, the left side engaging member 19 is pushed to the opening end face 1b of the box body 1 at the outside end and oscillated clockwise in FIG. 3, and the engagement of the outside end of the left side engaging member 19 with the step part 15b is released. Therefore, the left side operation button 15 or left side hinge pins 11a, 11b return to the original position X0 or Y0 (shown in FIG. 1 and FIG. 8) by the restoring force of the springs 13a, 13b or spring 26.

Thus, in the above lid opening/closing apparatus, the lid body 2 can be opened and closed to either side of right and left with a single operation, and in this case, there is no possibility that the lid body 2 is separated. Because, the left side operation button 15 or right side operation button 16 is separately disposed on right and left, and the possibility of pushing the opposite operation button to open the lid body 2 to either side is quite low, and even if the opposite operation button is pushed, it is impossible to slide the operation button to the engagement releasing position by the action of the aforementioned left side engaging member 19 or right side engaging member 20 and the rod 21, and it does not occur that both of the left side hinge pins 11a, 11b or right side hinge pins 12a, 12b are retracted.

This invention is not limited to the above examples but can be modified variously. For example, pulleys may be provided instead of the above slide contact pins 28a, 28b, 29a, 29b, and the routing of the tension cables 17a, 17b, 18a, 18b may be changed to make the relation of moving amount between each hinge pin and each operation button to 2 to 1, and the operation stroke of the operation button to retract each hinge pin can be lowered. And, the engaging member may be made of a link energized in the engaging direction by the spring. Further, the structure may be changed to a structure that the end of the engaging member does not project from the lower face of the lid body 2, and a projection may be formed on the opening end face 1b of the box body 1 and this projection goes into the lid body and pushes the end of the engaging member when the lid body 2 is pushed down. Thus, appearance of the back face of the lid body can be improved.

According to the lid opening/closing apparatus of this invention, the lid body can be opened to either side of right and left with a single operation by releasing the engagement of the hinge pin on one side by operating the operation button, and when the lid body is opened, the release of engagement of the other hinge pin by the other operation button is surely prevented by the action of the engaging member and the rod. Thus, it has an effect of perfectly preventing the disengagement of the lid body when it is opened.

The lid opening/closing apparatus of this invention has effects that the lid body can be opened to either side of right and left with a single operation and the lid body is not disengaged when opened. And, the operation stroke and operation force can be quite easily set to an optimum respectively by the design, and appearance becomes good because the hinge pins and operation buttons are not exposed out. Further, as it is structured to use the tension cables as the operation force transmitting member for projecting and retracting the hinges, the construction can be simplified and its weight can be reduced. When the lid body is opened, the other hinge pins are prevented from being released its engagement by the other operation button, by the action of engaging member and the rod, and the disengagement of the lid body when opened can be completely prevented.

What is claimed is:

1. A lid operating mechanism for opening and closing a lid body from left and right sides of a box body having front and rear side walls, left and right side walls, and a bottom wall, comprising:

a pair of left side hinge pins provided along a left side edge of said lid body for movement between a projecting position where said left side hinge pins project from front and rear ends of said lid body and a retracted position where said left side hinge pins retract into said lid body;

a pair of right side hinge pins provided along a right side edge of said lid body for movement between a projecting position where said right side hinge pins project from front and rear ends of said lid body and a retracted position where said right side hinge pins retract into said lid body;

bearing holes provided on upper left and right inside corners of said front and rear walls of said box body for receiving said hinge pins in said projecting position to thereby secure said lid body to said box body for rotation;

bias means provided within said lid body biasing said hinge pins toward said projecting position;

left and right side square recesses extending inwardly from said left and right side edges of said lid body and having top and bottom walls, side walls, and a rear wall;

left and right side operation buttons provided within said square recesses for sliding toward and away from each other in a widthwise direction of said lid body between an opening position where said left or right side button is depressed for opening said lid body and a closing position where said left or right side button respectively is released after said lid body is closed;

left and right side cable means directly connecting said left and right side hinge pins and said left and right side operation buttons, respectively, and having a first section extending in said widthwise direction and a second section extending in a lengthwise direction of said lid body so that when said left or right side operating button is depressed into said opening position, said left or right side cable means, respectively, pulls said left or right side hinge pins, respectively, into said retracted position to thereby allow opening of said lid body about said right or left side hinge pins, respectively.

2. The lid operating mechanism of claim 1, wherein said operation buttons are provided with sliding shafts extending inwardly from said operation buttons through said rear walls of said square recesses and having stopper means on their free ends for restricting strokes of said operation buttons to thereby prevent said operation buttons from projecting outwardly from said lid body.

3. The lid operating mechanism of claim 1, which further comprises pulley means attached to said operation buttons so as to double said cable means in said first section to thereby amplify replacement strokes of said operation buttons.

4. The lid operating mechanism of claim 1, which further comprises:
  left and right side engaging means provided on said bottom wall of said square recesses for engaging said left and right side operation buttons, respectively, in said opening position to thereby prevent said operation buttons from returning to an original position; and
  rod means provided within said lid body for sliding in said widthwise direction between said left and right operation buttons and having a length sufficiently large to contact both said operation buttons when one of said operation buttons is depressed into said open position.

5. The lid operating mechanism of claim 4, wherein said engaging means comprises a swing member disposed below a lower surface of said operation buttons for swinging between a latch position where it engages with a shoulder provided on said lower surface of said operation buttons in said open position and a release position where it is disengaged from said shoulder and said lid is closed.

6. A lid operating mechanism for opening and closing a lid body from left and right sides of a box body having front and rear side walls, left and right side walls, and a bottom wall, comprising:
  a pair of left side hinge pins provided along a left side edge of said lid body for movement in a lengthwise direction of said lid body between a projecting position and a retracted position;
  a pair of right side hinge pins provided along a right side edge of said lid body for movement in said lengthwise direction of said lid body between a projection position and a retracted position;
  bearing holes provided on upper left and right corners of said front and rear walls of said box body for receiving said hinge pins in said projecting position to thereby secure said lid body to said box body for rotation;
  biasing means disposed within said lid body biasing said hinge pins toward said projecting position;
  left and right side operation buttons provided within said lid body for sliding toward and away from each other in a widthwise direction between an open position where said left or right side operation button is depressed and a closed position where said left or right side operation button, respectively, returns to an original position after said lid body is closed;
  left and right side cable means directly linking said left and right side operation buttons to said left and right side hinge pins, respectively, so that when said left or right side operation button is depressed to said open position, said left or right side cable means pulls said left or right side hinge pins into said retracted position to thereby allow turning said lid body in a clockwise or counterclockwise direction about said right or left side hinge pins for opening said lid body;
  left and right side engaging means provided on said lid body for engagement with said operation buttons in said open position thereby preventing said operation buttons from returning to said original position;
  rod means provided on said lid body for sliding in said widthwise direction between said operation buttons and having a length sufficiently large to contact with both said operation buttons when one of said operation buttons is depressed to said open position so that the other operation button is prevented from being depressed to said open position.

7. The lid operating mechanism of claim 6, which further comprises retaining means provided at a bottom of said bearing holes for movement in a vertical direction to thereby allow said lid body to be depressed slightly beyond said closed position.

8. The lid operating mechanism of claim 7, wherein said engaging means comprises a swing member for swinging below said operation buttons between a latch position where said operation button is depressed into said open position and a release position where said lid body is depressed beyond said closed position as said retaining means is moved downwardly.

* * * * *